(12) United States Patent
Huo et al.

(10) Patent No.: US 7,120,431 B1
(45) Date of Patent: Oct. 10, 2006

(54) SYSTEM AND METHOD FOR ADJUSTING ANTENNA RADIATION IN A WIRELESS NETWORK

(75) Inventors: David Di Huo, Lafayette, NJ (US); Eshwar Pittampalli, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/249,312

(22) Filed: Feb. 12, 1999

(51) Int. Cl.
*H04Q 7/20* (2006.01)
*H04B 17/00* (2006.01)

(52) U.S. Cl. .................. 455/423; 455/446; 455/447; 455/67.11; 455/63.1

(58) Field of Classification Search ............. 455/423, 455/67.1, 63, 561, 562, 422, 441, 444–449, 455/63.1, 562.1; 370/442, 321, 337, 347
See application file for complete search history.

(56) References Cited

U.S. PATENT DOCUMENTS

| | | | | |
|---|---|---|---|---|
| 3,906,505 A | * | 9/1975 | Lipsky | 342/432 |
| 4,045,800 A | * | 8/1977 | Tang et al. | 342/372 |
| 4,224,622 A | * | 9/1980 | Schmidt | 342/78 |
| 4,249,181 A | | 2/1981 | Lee | |
| 4,947,176 A | * | 8/1990 | Inatsune et al. | 342/173 |
| 5,095,500 A | | 3/1992 | Tayloe et al. | |
| 5,117,503 A | * | 5/1992 | Olson | 455/502 |
| 5,485,631 A | * | 1/1996 | Bruckert | 455/446 |
| 5,488,737 A | | 1/1996 | Harbin et al. | |
| 5,752,164 A | * | 5/1998 | Jones | 455/454 |
| 5,890,067 A | * | 3/1999 | Chang et al. | 455/446 |
| 5,949,988 A | * | 9/1999 | Feisullin et al. | 703/2 |
| 5,966,670 A | * | 10/1999 | Keskitalo et al. | 455/562.1 |
| 6,006,113 A | * | 12/1999 | Meredith | 455/561 |
| 6,070,090 A | * | 5/2000 | Feuerstein | 455/561 |
| 6,144,652 A | * | 11/2000 | Avidor et al. | 370/336 |
| 6,181,276 B1 | * | 1/2001 | Schlekewey et al. | 342/372 |
| 6,240,149 B1 | * | 5/2001 | Yukitomo et al. | 375/347 |
| 6,282,434 B1 | * | 8/2001 | Johannisson et al. | 455/562.1 |
| 6,311,075 B1 | * | 10/2001 | Bevan et al. | 455/562.1 |
| 6,330,458 B1 | * | 12/2001 | Lamoureux et al. | 455/561 |
| 6,397,067 B1 | * | 5/2002 | Tanaka et al. | 455/446 |
| 6,400,335 B1 | * | 6/2002 | Weaver et al. | 343/853 |
| 6,404,386 B1 | * | 6/2002 | Proctor et al. | 342/368 |
| 6,405,043 B1 | * | 6/2002 | Jensen et al. | 455/446 |
| 6,408,169 B1 | * | 6/2002 | Pallonen | 455/277.2 |
| 6,453,177 B1 | * | 9/2002 | Wong et al. | 455/562.1 |
| 6,574,461 B1 | * | 6/2003 | Skold | 455/277.2 |

FOREIGN PATENT DOCUMENTS

| | | |
|---|---|---|
| CA | 2193741 | 10/1996 |
| CA | 225889 | 12/1997 |
| EP | 0841826 | 5/1998 |
| WO | WO 9637969 | 11/1996 |
| WO | WO 98/25362 | 6/1998 |

OTHER PUBLICATIONS

M. Locatelli, "Convergence Properties of Simulated Annealing for Continuous Global Optimization", *J. Appl. Prob.* vol. 33 pp. 1127-1140 (1996).

* cited by examiner

*Primary Examiner*—Edan Orgad

(57) ABSTRACT

A method for adjusting antenna radiation in a wireless network involves varying antenna radiation directions of antennas throughout a defined range. A test receiver measures signal parameters from the antennas at measurement locations as the antenna radiation directions are varied. The processing system determines a resultant antenna radiation direction for each of the antennas in the wireless network, or segment thereof, based upon the measured signal parameters.

41 Claims, 8 Drawing Sheets

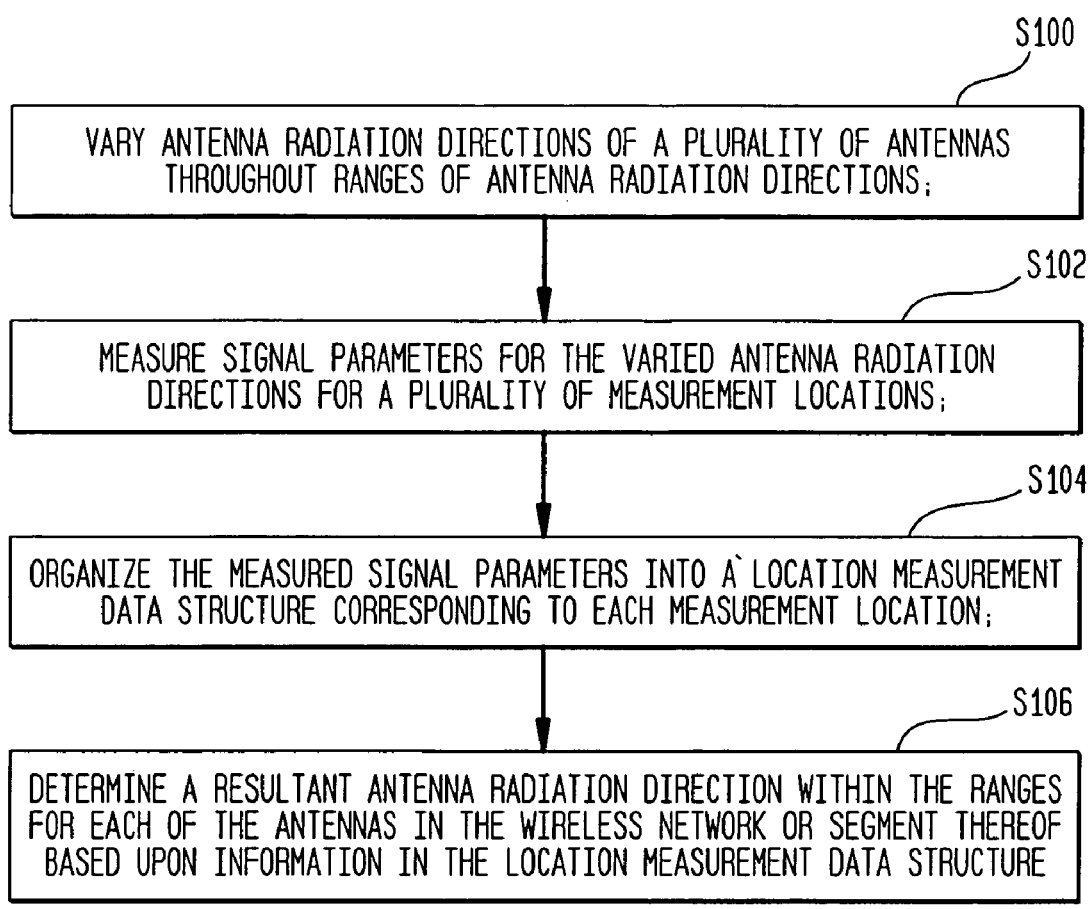

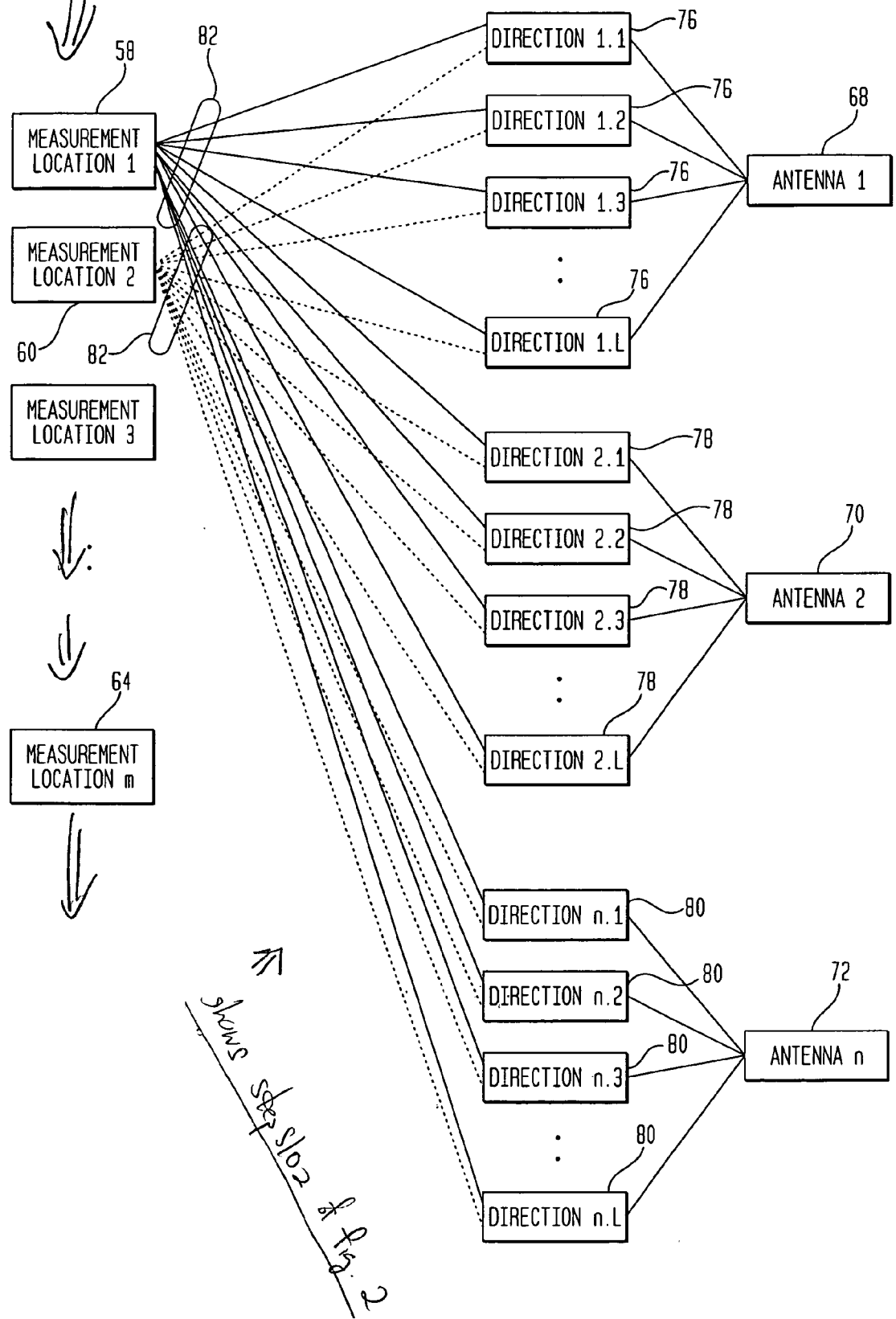

$$\left\{ \begin{array}{cccc} S_1(x,e_1^1) & S_1(x,e_2^1) & \cdots & S_1(x,e_q^1) \\ S_2(x,e_1^2) & S_2(x,e_2^2) & \cdots & S_2(x,e_q^2) \\ \vdots & \vdots & \vdots & \vdots \\ S_n(x,e_1^n) & S_n(x,e_2^n) & \cdots & S_n(x,e_q^n) \end{array} \right\}$$

FIG. 6

$$102 \searrow$$

$$\left\{ \begin{array}{cccc} S_2(x^1,e_1^2) & S_2(x^1,e_2^2) & \cdots & S_2(x^1,e_q^2) \\ \vdots & \vdots & \vdots & \vdots \\ S_n(x^1,e_1^n) & S_n(x^1,e_2^n) & \cdots & S_n(x^1,e_q^n) \end{array} \right\} = \begin{array}{l} \text{FIRST TEST} \\ \text{LOCATION} \\ \text{MEASUREMENT} \\ \text{MATRIX OF} \\ \text{SIGNAL STRENGTH} \\ \text{SERVED BY} \\ \text{ANTENNA } i=1 \end{array}$$

$$\vdots$$

$$\left\{ \begin{array}{cccc} S_1(x^m,e_1^1) & S_1(x^m,e_2^1) & \cdots & S_1(x^m,e_q^1) \\ S_2(x^m,e_1^2) & S_2(x^m,e_2^2) & \cdots & S_2(x^m,e_q^2) \\ \vdots & \vdots & \vdots & \vdots \\ S_n(x^m,e_1^n) & S_n(x^m,e_2^n) & \cdots & S_n(x^m,e_q^n) \end{array} \right\} = \begin{array}{l} \text{LAST TEST} \\ \text{LOCATION} \\ \text{MEASUREMENT} \\ \text{MATRIX OF} \\ \text{SIGNAL STRENGTH} \\ \text{SERVED BY} \\ \text{ANTENNA } i=1 \end{array}$$

$$104 \searrow$$

$$\left\{ \begin{array}{cccc} N_1(x^1,e_1^1) & N_1(x^1,e_2^1) & \cdots & N_1(x^1,e_q^1) \\ N_2(x^1,e_1^2) & N_2(x^1,e_2^2) & \cdots & N_2(x^1,e_q^2) \\ \vdots & \vdots & \vdots & \vdots \\ N_n(x^1,e_1^n) & N_n(x^1,e_2^n) & \cdots & N_n(x^1,e_q^n) \end{array} \right\} = \begin{array}{l} \text{FIRST TEST} \\ \text{LOCATION} \\ \text{MEASUREMENT} \\ \text{MATRIX OF} \\ \text{BACKGROUND} \\ \text{NOISE} \end{array}$$

$$\vdots$$

$$\left\{ \begin{array}{cccc} N_1(x^m,e_1^1) & N_1(x^m,e_2^1) & \cdots & N_1(x^m,e_q^1) \\ N_2(x^m,e_1^2) & N_2(x^m,e_2^2) & \cdots & N_2(x^m,e_q^2) \\ \vdots & \vdots & \vdots & \vdots \\ N_n(x^m,e_1^n) & N_n(x^m,e_2^n) & \cdots & N_n(x^m,e_q^n) \end{array} \right\} = \begin{array}{l} \text{LAST TEST} \\ \text{LOCATION} \\ \text{MEASUREMENT} \\ \text{MATRIX OF} \\ \text{BACKGROUND} \\ \text{NOISE} \end{array}$$

SYSTEM AND METHOD FOR ADJUSTING ANTENNA RADIATION IN A WIRELESS NETWORK

FIELD OF THE INVENTION

The invention generally relates to a system and method for adjusting antenna radiation in wireless networks to minimize co-channel interference.

BACKGROUND OF THE INVENTION

Whenever a wireless network is initially installed or expanded, various wireless parameters must be tuned to proper values prior to full commercial operation. The tuning of wireless parameters is referred to as radio frequency (RF)network optimization. The RF optimization typically includes adjusting the direction of base station antennas and the transmit power of down-link transmitters.

Wireless service providers often have relied upon a trial-and-error strategy to optimize radio frequency antenna coverage of cells or other geographic areas within a wireless network. The trial-and-error strategy requires repeated measurements at the same locations through iterative test drives until a feasible constellation of the antenna direction for each base station is found. The test drive refers to taking radio frequency measurement samples from a vehicle which is equipped to measure radio frequency parameters versus location while driving through the coverage area of a wireless network. Based on recorded measurements of parameters in a cluster of cells during a test drive, recommendations on adjusting system parameters are established. However, the trial-and-error approach sometimes leads to quality deterioration or service interruption if incorrect recommendations are applied to an operational system. After the recommended changes to system parameters are implemented, another test drive typically is completed to validate system performance. If the latest test drive did not indicate adequate performance, the wireless network or expansion may be delayed from commercial operation, while yet another round of parameter adjustments is followed by a corresponding test drive.

Even if a wireless network timely goes into commercial operation, improper radio frequency optimization may reduce the capacity of a wireless network. Failure to accurately optimize radio frequency coverage may lead to unnecessary expenditures for capital intensive cellular infrastructure. For example, additional channel capacity or additional cell sites, which are not truly needed, may be added to compensate for an incorrectly optimized wireless system.

The trial-and-error approach to optimization wastes valuable time of engineering and technical resources by often entailing iterative or multiple field measurements to obtain an acceptable solution for radio frequency optimization. The repetitive nature of the trial-and-error tends to make such an approach difficult or impractical for handling large networks. Thus, a need exists for improving the accuracy of optimization rather than relying on the time-consuming and happenstance accumulation of empirical data.

As wireless networks evolve from second generation wireless networks to third generation wireless networks, applying trial-and-error techniques for optimization of radio frequency coverage may become outdated because third generation wireless networks are expected to entail significant complexity in the number of variables and permutations associated with antenna radiation patterns. Second generation wireless networks primarily concern varying the antenna direction in the vertical direction, which is commonly known as down-tilt. In contrast, third generation wireless networks are expected to be capable of varying the base station antenna radiation pattern both vertically and horizontally.

SUMMARY OF THE INVENTION

In accordance with the invention, a method for adjusting radio frequency coverage in a wireless network involves varying antenna radiation directions of antennas in a controlled manner to permit measurement of signal parameters (e.g., signal strengths). A test receiver measures signal parameters from the antennas at measurement locations as the antenna radiation directions are varied. A processing system determines a resultant antenna radiation direction for each of the antennas in the wireless network, or segment thereof, based upon the measured signal parameters.

The resultant antenna radiation directions of downlink antennas are directed in antenna radiation directions so that the carrier-to-interference at the test receiver is sufficient, maximized, or meets another acceptable performance standard, for selected measurement locations throughout the wireless network. An antenna radiation direction signifies the azimuth angle, the downtilt angle, or both at which a directional or down-tilted radiation pattern has the maximum gain with respect to received or transmitted electromagnetic signals. The systematic attributes of the method and its associated data structure increase the efficiency of radio frequency optimization by eliminating the recursive or iterative nature of taking field measurements pursuant to the conventional trial-and-error approach.

BRIEF DESCRIPTION OF THE DRAWINGS

FIG. 2 is a flow chart illustrating a method of adjusting antenna radiation in a wireless network according to the invention.

FIG. 4 is a block diagram showing a measurement procedure in accordance with the invention.

FIG. 5 illustrates a data structure of a location matrix for measuring signal-to-interference ratio in accordance with the invention.

FIG. 6 illustrates data structures of location matrices for measuring interference and background noise in accordance with the invention.

DETAILED DESCRIPTION OF THE PREFERRED EMBODIMENTS

Figure 1:
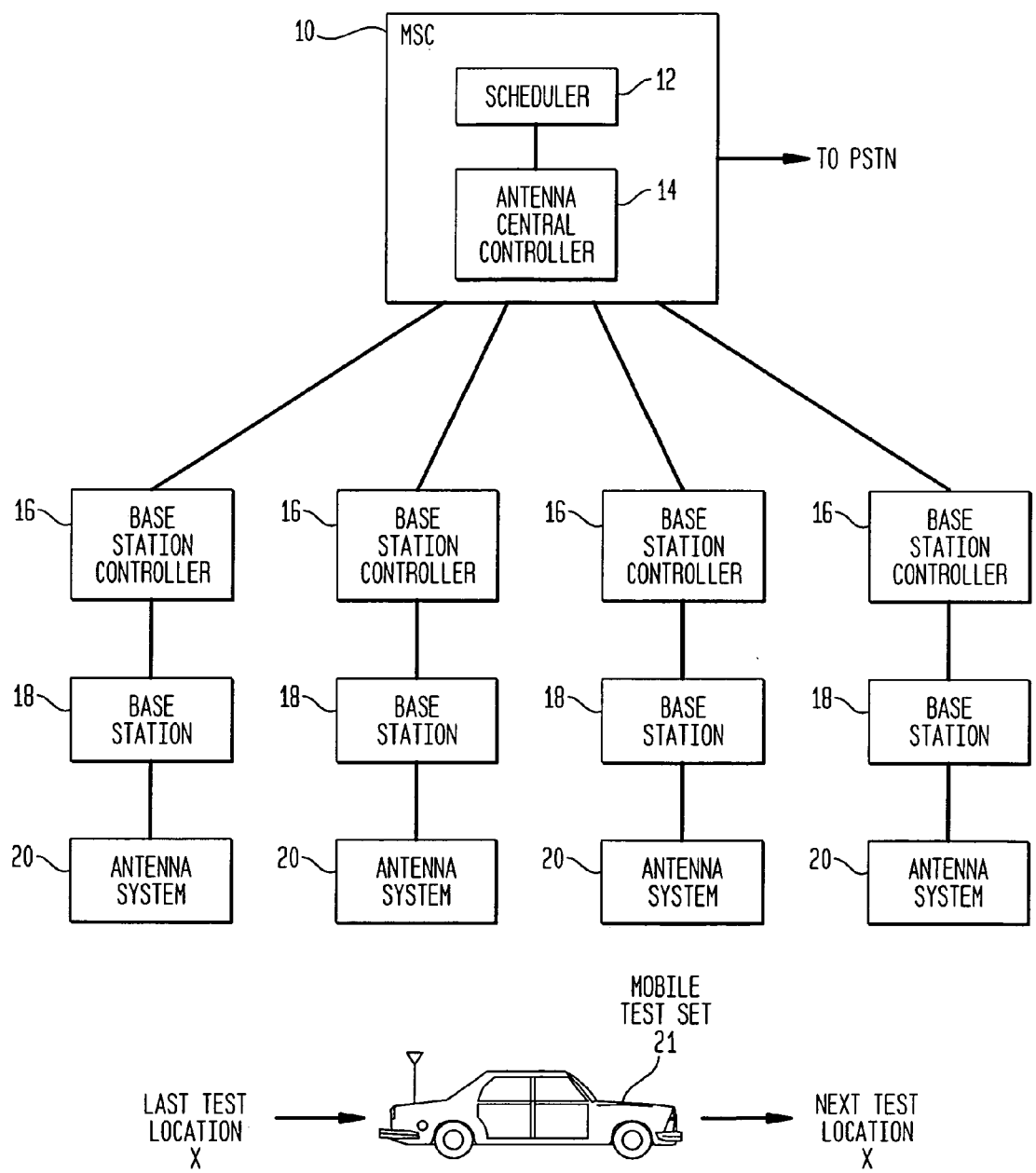
FIG. 1 is a block diagram of a first embodiment of a wireless network in accordance with the invention.

In accordance with the invention, FIG. 1 shows a wireless network including a mobile switching center 10 coupled to a plurality of base station controllers 16 via communication lines. A base station controller 16 is coupled to a base station 18 and an antenna system 20. In practice, a base station controller 16, base station 18, and an antenna system 20 may be co-located to form a cell site serving a geographic region via radio frequency coverage.

The mobile switching center 10 generally comprises any telecommunications switch suitable for supporting switching and control functions in cooperation with the base station controllers 16. In practice, the mobile switching center 10 communicates with at least one other telecommunications switch to connect the mobile switching center 10 with the public switched telephone network (PSTN), a wireless network, or both.

The mobile switching center 10 differs from many standard commercially available switches in two respects. First, the mobile switching center 10 includes a scheduler 12 for scheduling the antenna direction of each antenna system 20. Second, the mobile switching center 10 includes a central antenna controller 14 in communication with the scheduler 12. The central antenna controller 14 and the scheduler 12 comprise software instructions and a compatible processing system for controlling the antenna systems 20 from a location of the mobile switching center 10.

The central antenna controller 14 is adapted to send command signals to the antenna systems 20 via the base station controller 16. The command signals may be routed from each base station controller 16, through the base station 18, to the respective antenna system 20. The central antenna controller 14 uses the command signals to control the radiation direction of each antenna in a corresponding antenna system 20 at any given instantaneous time. The central antenna controller 14 generally changes the antenna radiation direction within a defined range of the available antenna radiation directions for each measurement location. The central antenna controller 14 preferably rotates a peak gain of the antenna radiation direction through the defined range of antenna direction states at least once for each test location. The central antenna controller 14 sends command signals to each antenna system 20 according to a schedule, such that the antenna radiation direction of each controlled antenna system 20 can be steered in a coordinated way.

The scheduler 12 includes a first list and a second list that coordinate changes in the radiation direction of each antenna. The first list and the second list are jointly referred to as a schedule. The first list organizes the antennas within the wireless network in an antenna measuring order. The antenna measuring order determines the sequence, in which electromagnetic transmissions from different antennas are measured.

The second list organizes the radiation direction measuring order for each antenna. The direction measuring order determines the sequence, in which electromagnetic transmissions from each antenna at different radiation directions is measured. According to the first and second lists, the central antenna controller 14, located in the mobile switching center 10, sends command signals to each base station 18 to steer the corresponding antenna radiation pattern to a given direction. Thus, at any instant, a peak gain of an antenna radiation pattern generally is pointing to a certain direction. The schedule generally requires a storage size that exceeds the combinations associated with number of the base stations 18 and the possible antenna radiation directions of each antenna.

The schedule determines the duration during which each antenna radiation pattern shall stay oriented toward a given direction. In accordance with a preferred configuration of the schedule, the central antenna controller 14 individually and sequentially scans each antenna within a range of possible radiation direction states, so that the test receiver 21 receives only from one antenna at any instant. After a controller pointer in the central antenna controller 14 reaches the last radiation direction of the last antenna in the schedule, the controller pointer is reset to the first direction of the next antenna; the next measurement cycle for the next antenna may begin. The measurement procedure is followed during the whole test drive from the first radiation direction of the first antenna to the last radiation direction of the last antenna at each measurement location, until an entire group of measurement locations are covered or at least until a statistically adequate portion of the measurement locations are covered to meet a selected confidence level. All of the measurement locations do not need to be covered if the radio frequency optimization method is only applied to a portion of the wireless network.

The measured signal parameters (e.g., signal strength) data collected during a test drive may be used to determine a resultant antenna radiation direction of each antenna. If the antenna radiation directions are aligned in the resultant antenna radiation directions, the resulting overall carrier-to-interference ratio integrated over the entire wireless network geographic coverage area may be maximized, or at least sufficient to meet practical radio frequency design goals.

The antenna system 20 generally comprises a phased-array antenna or another antenna with a dynamically controllable radiation pattern. An antenna radiation direction refers to the direction of a peak gain of a main lobe of a directional antenna of any design, including a phased-array antenna. A phased-array antenna includes phase shifters or other signal processing techniques to alter the radiation pattern of the antenna system 20 in response to the central antenna controller 14 or another antenna controller. By means of phased-array antenna, not only the radiation direction of the antenna, but also the radiation pattern shape of the antenna can be changed electronically. Accordingly, the network operator can optimize or enhance the network performance with respect to the topography and traffic. In accordance with the invention, the system and systematical method for adjusting antenna radiation is well-suited to exploit the flexibility in radiation pattern direction changes of phased array antennas.

Theoretically, each antenna is capable of assuming any radiation direction within a given range; the domain of the antenna radiation direction is a continuum. In practice, however, many commercially available antenna systems 20 provide only discrete radiation states for antenna radiation directions. The antenna radiation directions and radiation direction changes can be tuned to discrete states in response to command signals from the central antenna controller 14. The range of the radiation states may be selected based on the generally desired radio frequency coverage of each antenna system 20 to limit the extent of measurements required at each location. For example, if an antenna system 20 is slated to serve a certain sector of a multi-sector cell, the range of antenna radiation directions could be limited to that sector (or slightly beyond it) for the corresponding antenna system 20. Limiting the range of antenna radiation patterns reduces the data processing burden of determining the resultant radiation directions and decreases the duration of the measurement process. If multiple antennas are associated with each base station, each antenna has a corresponding antenna identifier for transmission by the base station to permit simultaneous or serial identification of active antennas that are radiating electromagnetic signals at a particular time.

A test receiver 21 includes a receiver for receiving a transmitted downlink electromagnetic signal from the base station 18. The transmitted downlink electromagnetic signal originates from the antenna system 20 at an antenna site. The base station 18 is adapted to transmit a unique base station identifier code for identification of actively radiating antenna systems 20 and their associated radiation directions. The test receiver 21 may facilitate the recording of the base station identifier codes along with corresponding signal parameter measurements for later reference. The antenna system 20 is preferably coupled to a corresponding transmit radio frequency port of a base station 18 through a transmission medium, such as a coaxial cable. A signal parameter measurer for measuring the signal parameter (e.g., signal strength) of the electromagnetic signal is coupled to the test receiver 21. The signal parameter measurer, such as a received signal strength indicator (RSSI), includes a recorder for recording measured signal strengths on a recording medium. The recorder may comprise a general purpose computer with a suitable analog or digital interface to the signal strength measurer. A measurable signal strength refers to any signal which has a signal strength exceeding the background noise. A measurable signal is susceptible to detection and measurement by a test receiver 21 having a suitable noise figure. The test receiver 21 requires a sojourn time at each measurement location, as prescribed by the aforementioned schedule.

The recorder records data samples received from the receiver on the recording medium in a way and format determined by the schedule. The recording medium is associated with a buffer consisting of as many registers as required to hold the expected data samples. The data samples may comprise signal parameter values (e.g., signal power or signal strength) corresponding to different measurement locations and different antenna sites. Therefore, the number of registers in each buffer should be at least as many as the antenna radiation directions designated to the corresponding antennas at different antenna sites.

The total storage size of the recording medium is commensurate with the number of antennas (n), the number of antenna radiation directional states for each antenna (l), and the number of locations (m), among other factors. Expressed mathematically, there are n×m×l data samples to be measured during the test drive.

FIG. 2 illustrates a method for adjusting antenna radiation in a wireless network in accordance with the invention. Starting in step S100, antenna radiation directions of a group of antennas are varied (i.e. cycled) throughout a range of antenna radiation directions. The antenna radiation directions are preferably controlled by a central antenna controller 14 located at the mobile switching center 10, although in an alternate embodiment the antenna radiation directions are controlled by a group of cooperating local antenna controllers at each site, which are synchronized to a common reference time.

An antenna radiation cycle represents the duration during which an antenna changes radiation directions from a first state to a last state within a range of states. The antenna controller or central antenna controller 14 preferably sets an antenna radiation cycle as commensurate with a stationary or mobile duration of a test receiver 21 at a test receiver location coincident with the measurement location. For example, if the scanning speed of each antenna system is much greater than the mobile speed, measurement error may be neglected for a mobile test receiver which moves through the measurement locations. Thus, the central antenna controller 14 establishes a universal schedule for coordinating the individual radiation direction changes of each antenna in accordance with antenna radiation cycles.

In step S102, a test receiver 21 measures signal parameters for the varied antenna radiation directions for a plurality of measurement locations. For example, the test receiver 21 measures signal parameters (e.g., signal strengths) from antennas at each selected measurement location for a radiation cycle. The measured signal parameters may include signal strengths, although in an alternate embodiment the measured signal parameters may include signal-to-noise, carrier-to-interference, frame-error rate, bit error rate, or another radio-frequency performance measurement. Each one of n base stations 18 serves a geographic coverage area called a cell. In total, m measurement locations are defined such that they represent the entire coverage area of the network. Correspondingly, there are m buffers required to record the measurement data. The storage capacity of the buffers is determined by the number of directional states each antenna is capable of producing. For the measurement in step S102, the test receiver 21 generally remains at each measurement location at least for one scanning period or cycle of each antenna.

The adjustment method may be simplified by only measuring and considering the beacon channels of the network in subsequent calculations. The beacon channels are generally indicative of the radio frequency coverage of each cell. For example, broadcast control channel (BCCH) in Group Special Mobile (GSM) and the pilot channel in CDMA (code-division multiple access) as described in IS-95 are beacon channels.

In step S104, a processing system preferably organizes the measured signal parameters into a data structure, such as a location measurement matrix corresponding to each measurement location. In step S106, the processing system determines a resultant antenna radiation direction within the range of antenna radiation states for each of the antennas in the wireless network (or segment thereof) based upon the data structure (e.g., location measurement matrices).

In a preferred embodiment, an antenna radiation direction is defined as a two-dimensional vector representing an azimuth angle and a down-tilt angle at which a peak gain is observed. In another preferred embodiment, a candidate for a resultant antenna radiation direction is defined as including a central vector representing a peak gain of a main lobe of radiation, a first limit vector representing a first limit of the main lobe and a second limit vector representing a second limit of the main lobe. The first and second limit may correspond to a radiation level some specified magnitude below the peak magnitude of the main lobe.

The processing system preferably determines a system-wide minimal average (or approximation thereof) of the interference signal strength over selected measurement locations to attain the corresponding resultant antenna radiation directions for the respective antennas at downlink equipment sites. In addition, the processing system may calculate the system-wide minimal average of the interference signal strength by including background noise over all selected measurement locations to attain the corresponding resultant antenna radiation directions. In an alternate embodiment, the system-wide maximum carrier-to-interference ratio (or an approximation thereof) is estimated instead of the system-wide interference level to attain resultant antenna radiation directions for a wireless network.

The adjustment method of the present invention, combines measurement procedures and mathematical data processing to provide a disciplined framework for efficiently adjusting radio frequency coverage of wireless networks. The central antenna controller 14 and the scheduler 12 control measuring operations, such that although all applicable measurement locations in the wireless network are preferably measured only once, radio frequency enhancement is still possible.

Figure 3A:
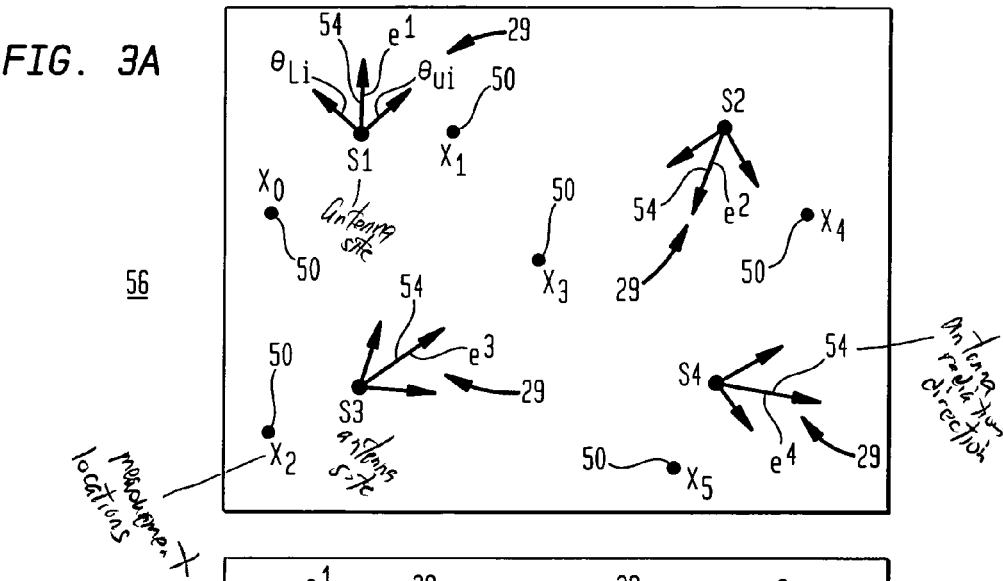
FIG. 3A through FIG. 3C are graphical depictions of potential resultant antenna radiation directions in accordance with the present invention.
Figure 3B:
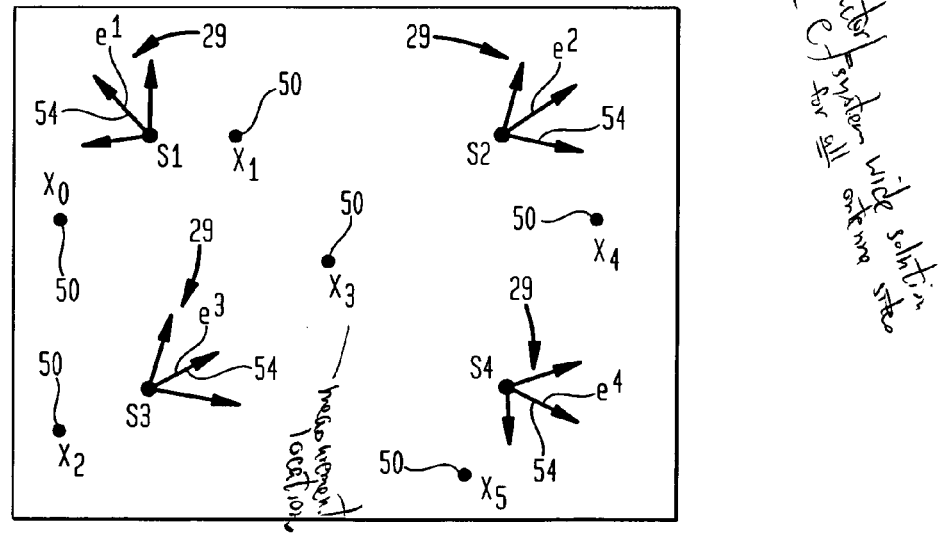
Figure 3C:
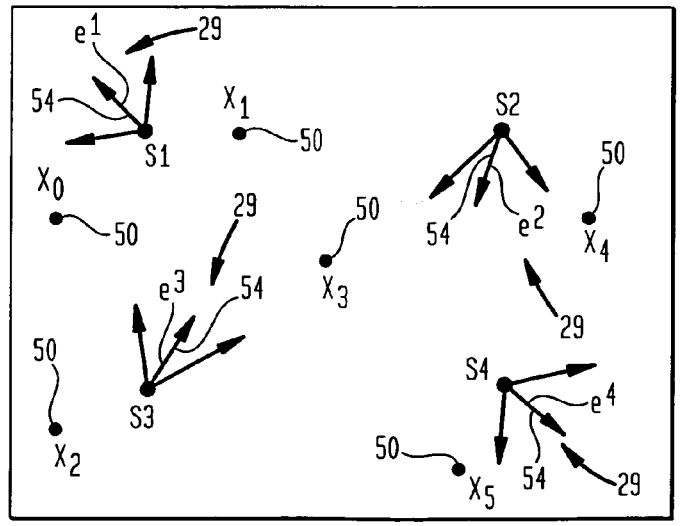

FIG. 3A through FIG. 3C each show illustrative graphical representations of potential constellations of resultant antenna radiation directions 54 for a wireless network 56 including four antenna sites. The antenna sites are labeled $S_1$ through $S_4$ and the antenna radiation directions 54 for the sites are labeled $e^1$ through $e^4$. The same communications system with the same measurement locations 50 are shown in FIG. 3A through FIG. 3C, except the antenna radiation directions 54 in each figure are different. The measurement locations 50 are labeled $x_0$ through $x_5$.

Each graphical representation has a corresponding value of average interference for a group of measurement locations 50 within the wireless system. The average interference could also be expressed in terms of a carrier-to-interference ratio, where interference includes all measurable electromagnetic energy (e.g., noise) within the carrier bandwidth. In accordance with the invention, the processing system identifies the lowest average interference (or approximation thereof) for a group of measurement locations and selects the resultant downlink antenna radiation directions 54 associated with the lowest average interference (or approximation thereof). The lowest average interference (or approximation thereof) may be expressed as the vector of a vector, called e, or graphically as reference number 29 as shown in FIG. 3A through FIG. 3C. The vector e represents a system-wide solution for all antenna sites, or selected sites in so far as the group of the measurement locations is representative of the radio frequency wireless network performance. Further, each measurement location can be assigned a significance in accordance with a particular weighting factor to flexibly tailor the system-wide solution to meet radio frequency performance objectives of a particular wireless network.

FIG. 4 shows step S102 of FIG. 2 in greater detail. The test receiver 21 measures signal strengths from the antennas generating the corresponding radiation direction permutations as shown. At a first measurement location 58, the test receiver 21 measures signal strengths from a first antenna 68, a second antenna 70, and an nth antenna 72. The first antenna 68, the second antenna 70, and the nth antenna 72 are preferably measured individually and sequentially according to the schedule in time-division multiplex manner. However, in an alternate embodiment simultaneous measurements of signal strengths may be made by using multiple receivers tuned to different frequencies, rather than a single receiver.

In yet another alternate embodiment, a single spread-spectrum receiver receives different pseudo-random noise codes or orthogonal codes to permit simultaneous measurement of multiple channels from different antennas capable of providing unique identifier codes for transmission by their associated base stations. The different antennas may even be associated with a common base station or a common site. In FIG. 4, beginning from the first measurement location 58, the first antenna 68 is measured while the antenna radiation directions are cycled through a first cycle 76 from radiation direction 1.1 to radiation direction 1.L. Following measurement of the first antenna 68, the test receiver 21 measures signal strength radiated from the second antenna 70, at the first measurement location 58, as the second antenna 70 is cycled through a second cycle 78 of radiation directions (or directional states) from 2.1 to 2.L. Following completion of the measurements of the second antenna 70, the process continues until the nth antenna 72 with the nth cycle 80 from radiation pattern n.1 to n.L is measured at the first measurement location 58. The total of all cycles for the first measurement location 58 equals one scanning period 82.

Following the first measurement location 58, the test receiver 21 is moved to the second measurement location 60 during which the first antenna 68, the second antenna 70, and the nth antenna 72 are sequentially measured as the first antenna 68 progresses through the first cycle 76, the second antenna 70 progresses through the second cycle, and the nth antenna 72 progresses through the nth cycle. The procedure continues until all selected measurement locations up to the mth measurement location 64 and all cycles of each antenna are covered.

FIG. 5 shows step S104 of FIG. 2 in greater detail. FIG. 5 represents a mathematical expression of a structured data format for organizing measured data and adjusting radio frequency coverage. The structured data format includes a location measurement matrix 100 for each location of a test receiver 21. Each location measurement matrix 100 comprises an array that includes signal parameter (i.e. signal power) measurements for a plurality of antenna directions for each antenna in the wireless network. However, any antenna which does not provide a measurable signal at the measurement location may be ignored in the location measurement matrix 100. The data structure is preferably stored in the recording medium and used to find the optimal antenna radiation direction for each antenna.

The following mathematical representations of the measured signal parameters are included in the location measurement matrix 100 of FIG. 5. $S_i(x,e^i)$ represents the signal power transmitted by antenna i and received at measurement location x, where $e^i$ refers to the direction of the transmit antenna i. The radiation direction $e^i$ may take on a subscript j such that $e^i$ becomes $e^i_j$, where i represents a transmit antenna identifier and j represents a directional state of the transmit antenna i. The subscript i of S represents the identity of a downlink antenna, which is the source of the signal power measurement at measurement location x. If only one downlink antenna i is associated with each corresponding base station 18, the antenna i may be used to reference the identity of the corresponding base station 18. One or more antennas and base stations 18 may be located at a single site. If an antenna operates independently from other antennas associated with a single base station, each independent antenna (e.g., sector antenna) requires an antenna identifier to facilitate identification of the active antennas by the test receiver. A solid angle $e^i$ is a two dimensional vector defined by the following equation:

$$e^i = (\theta_i, \phi_i) \qquad (1)$$

where $\theta_i$ angle and $\phi_i$ angle refers to the vertical and azimuth angle of an antenna radiation direction, respectively. Assume that each antenna has a clearly defined reference direction and that $e^i$ is measured relative to the corresponding reference direction of antenna i. For example, in a sectorized cell, or another suitable configuration, each antenna i has a given range of radiation directions defined by the following equations:

$$\theta_i \in [\theta_{Li}, \theta_{Ui}] \qquad (2)$$

$$\phi_i \in [\phi_{Li}, \phi_{Ui}] \qquad (3)$$

where $L_i$ and $U_i$ refers to the first limit (e.g. lowerbound) and the second limit (e.g., upper bound) of antenna i, respectively. At location x a mobile station should receive from station i the following sequence of signals:

$$S_i(x,e_1^i), S_i(x,e_2^i), S_i(x,e_3^i), \ldots, S_i(x,e_q^i) \qquad (4)$$

where $i=1, 2, \ldots, n$ and each antenna assumes q directions. For any given location, $S_i$ depends only on e. Therefore, the signals from different antennas can be received in sequence. Because of synchronization of radiation direction scanning between antennas, the test receiver 21 at measurement location x will preferably record in accordance with the location measurement matrix 100 illustrated in FIG. 5.

For the expression set forth in the location measurement matrix 100 to be valid, the test receiver 21 dwells at each measurement location x for a duration equal to or greater than a single scanning period. A scanning period is equal to a sum of the radiation direction cycles for a given measurement location. Each antenna cycle refers to a complete range of q possible radiation direction states for a corresponding antenna that produces a measurable signal at the measurement location. For $i=1, 2, \ldots, n$, all values of the solid angle $e^i_j$, with $j=1, 2, \ldots, q$, are taken from the following expression:

$$[\theta_{Li}, \theta_{Ui}] \times [\phi_{Li}, \phi_{Ui}] \qquad (5)$$

For each measurement location, a location measurement matrix 100 is preferably recorded in accordance with the data structure of FIG. 5. For m measurement locations, there are m matrices of the same data structure. The aggregate of m matrices represents a three-dimensional block, which makes it possible to find the proper antenna direction for all antennas, if searching rules are provided.

Each row of the location measurement matrix 100 of FIG. 5 represents a different downlink antenna. Each of the measurement matrix location rows refers to an antenna identified by the subscript of S and the superscript of e. For example, a measurement matrix row for an nth antenna is expressed as follows:

$$S_n(x,e_1^n), S_n(xe,e_2^n), \ldots (S_n(x,e_q^n) \qquad (6)$$

In practice, one downlink antenna may be associated with a downlink transmission of a corresponding base station 18. The columns of the data structure may represent uniform increments of direction changes between the columns. Further, each column may be arranged such that all of the antenna directions of different antennas face in the same direction. That is, the first column, for example, could represent a 0° antenna radiation direction in terms of an azimuth angle, whereas the second column could represent a 10° antenna radiation direction.

In general, the antenna radiation direction coincides with a peak gain of the main lobe of the radiation pattern. The peak gain is uniquely defined as any single or multidimensional range within the main lobe of the radiation pattern. Virtually any shape of radiation pattern may be used to practice the invention. For example, if only the azimuth plane is considered, the main lobe of a cardiod radiation pattern may be defined by a pair of azimuth angles corresponding to the half-power points (3 dB lower than the peak gain) of the radiation pattern gain.

The antenna radiation direction may be specified in accordance with an azimuth angle ranging from zero to 360, by convention and a vertical angle ranging from zero to 90 degrees. The antenna radiation direction may include downlink azimuth angle, downlink downtilt angle, or both. In a preferred configuration, each row has a number of entries equal to the number of intervals between zero and 360 degrees. The number of intervals are preferably commensurate with the number of possible antenna directional states.

FIG. 5 contains sufficient information to calculate the carrier-to-interference (or signal-to-noise ratio) for the single measurement location x. In contrast, FIG. 6 contains sufficient information in location matrices to determine the minimum interference (or approximation thereof) for all values of x within the communication system. Here, for illustrative purposes, the antenna site or base station $S_1$ is excluded because the measurement location $x_1$ is served by site $S_1$, so $S_1$ is not defined as an interfering transmission source.

Because each two-dimensional location measurement matrix 100 shown in FIG. 6 has a height and a width, the depth of each matrix is determined by the maximum number m of measurement locations x. The lower group of matrices of FIG. 6 show background noise matrices that is similar to the upper group of matrices shown in FIG. 6. $N_i(x,e^i_j)$ represents a measured noise power where the subscript i of N represents a noise power from base station i, at measurement location x, in antenna radiation direction $e^i_j$ among q possible antenna radiation directions and n possible antennas. The superscript of x merely represents a particular measurement location among m possible measurement locations. A respective background noise matrix 104 may be created for each test location and added to the corresponding location measurement matrix 100, having the same value for the measurement location x, to indicate radio interference within the wireless network. However, in some circumstances the background noise matrices may be so uniform with direction, that the information may be compressed into a scalar format without sacrificing accuracy in calculating the average system-wide interference level.

Power control algorithms may be taken into account in the antenna adjustment procedure by taking additional measurements for various power settings at each antenna location. Such a procedure would add additional dimensions to the location measurement matrix 100. Advantageously, the high degree of order in the array allows powerful mathematical techniques to be readily applied to enhance or optimize the radio frequency coverage for at least the location x on an individual basis. Moreover, the measurement process may be performed in a modular way in which measurement locations are readily redefined, added, or deleted to meet practical radio frequency coverage requirements.

The above data structure described in FIG. 5 and FIG. 6 contains a significant amount of information about the wireless network and is organized to permit mathematical operations to solve for a minimal average interference (or maximum carrier-to-interference ratio) corresponding to an antenna direction for each antenna, subject to any traffic weighting considerations as, for example, manifested in weight factors individually assigned to various measurement locations.

Figure 7:
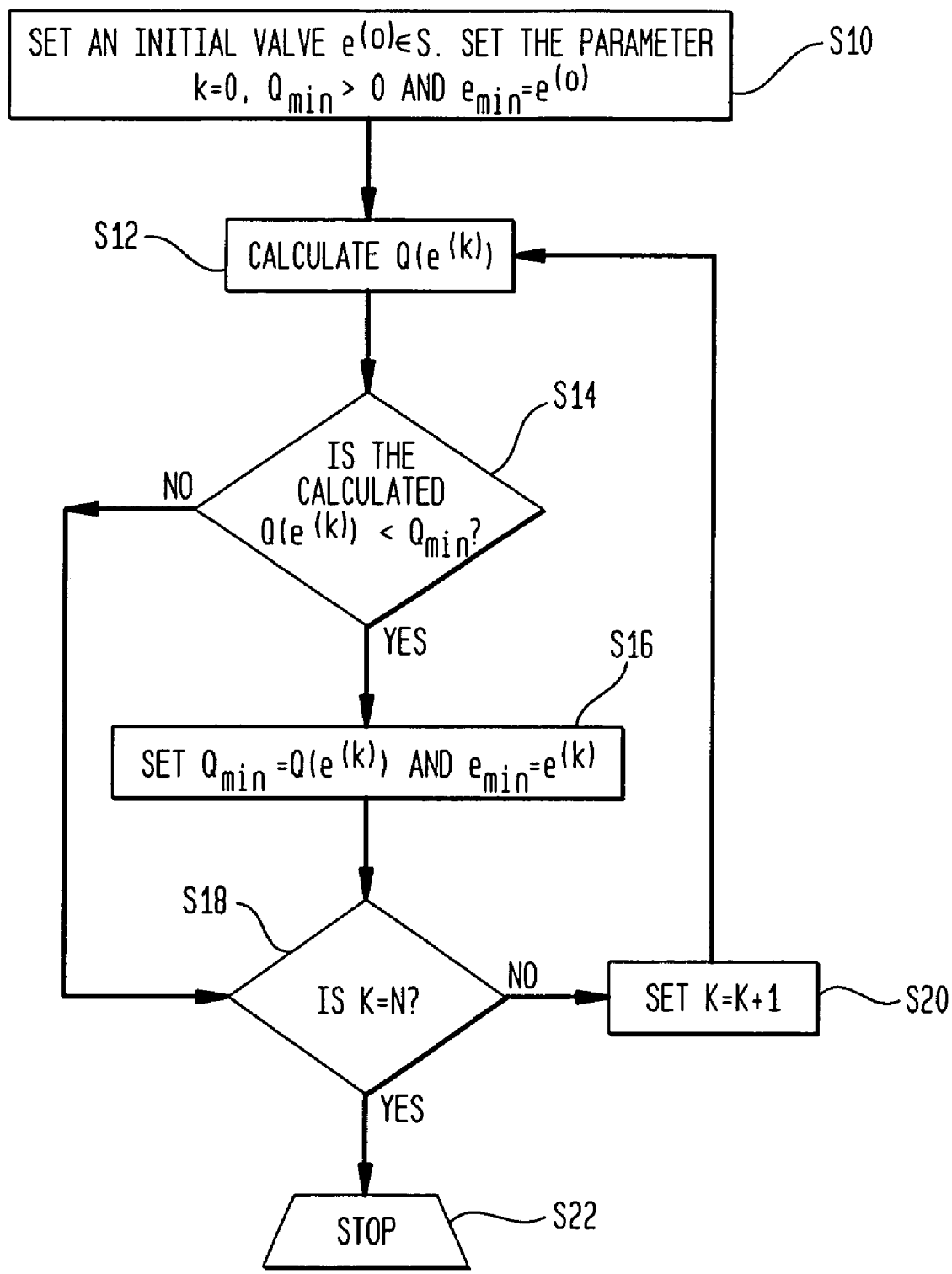
FIG. 7 is a flow chart showing an intensive procedure for determining resultant antenna radiation directions to minimize average interference in the wireless network in accordance with the invention.

An intensive comparison approach for determining a resultant antenna radiation direction for each antenna is shown in the flow chart of FIG. 7. FIG. 7 represents one procedure for accomplishing step S106 of FIG. 2. Basically, the intensive comparison approach successively determines and compares system-wide average interference values for a group of measurement locations. The system-wide average interference values cover an entire group of measurement locations or selected measurement locations in the wireless network. A proposed minimal average interference value represents a proposal for the lowest system-wide average interference value (or an approximation thereof) over the selected measurement locations. In accordance with the intensive calculation approach, the proposed minimal average interference value may be compared with another system-wide interference value, covering the same selected measurement locations, to identify the lowest system-wide interference or an acceptable level of system-wide interference. After comparing all or some of system-wide average interference values, the resultant radiation directions corresponding to the lowest system-wide interference value or an acceptable level of system-wide interference represent the outcome of the intensive comparison approach.

In a preferred embodiment, the intensive procedure, for determining the resultant radiation directions of the antennas within the wireless network, comprises comparing successive averages of interference measurements. Each average of the interference measurements is associated with corresponding candidate constellation of antenna radiation directions. The processing system compares a present average of interference measurements and a previous lowest average of interference measurements and identifies the lower average of the two as a proposal for the lowest system-wide interference. The processing system selects the resultant antenna directions corresponding to the proposal for the lowest system-wide interference. The foregoing comparison procedure may be repeated with further successive averages of interference measurements until an acceptable level of system-wide interference is attained. An acceptable level of system-wide interference may be based upon empirical studies or expectations from practical observations of any wireless network analogous to the wireless network being optimized. In cases where an exact lowest interference measurement (or approximation thereof) is required, the process continues until all average system-wide interference levels are compared.

To enhance the radio frequency performance of the wireless network, the average minimum interference is calculated or estimated for selected values or all values of the measurement locations of x and the associated location matrices. The average preferably comprises a weighted average, although in other embodiments the average is any function of the coverage area over the variable x (i.e. measurement location). Each of the measurement location is assigned a corresponding weight factor for calculating a weighted average superseding the average. The total of weighting factors corresponding to all measurement locations x has an aggregate weight factor of approximately or exactly equal to one. For example, if all locations are assigned an equal weight factor, the weight factor for each measurement location equals one divided by the number of measurement locations. If an area has priority because of greater traffic carrying ability, the weighting factors of measurement locations within the priority area are assigned higher weight factors than they would receive in accordance with the above equal weight factor approach. Accordingly, certain lower-than-average weight factors are produced as a byproduct of the priority areas because the sum of all weight factors does not exceed one.

The above general principles are now applied to FIG. 7 in a mathematical context. Theoretically, the minimum of system-wide interference, $Q(e)$, should be found in a continuous domain, if it exists. However, a practical application of mathematical principles dictates a solution in the discrete domain where a genuine solution for radio frequency optimization is feasible. When the number of total possible values of e is reasonable in terms of the available processing capacity, memory capacity, and general capability of the processing system, the intensive comparison method is feasible and may be used to attain an exact solution.

The intensive comparison procedure includes the algorithm illustrated in FIG. 7 for finding the e (i.e. a constellation of antenna radiation directions) that minimizes $Q(e)$ (i.e. a system-wide interference over the considered measurement locations). Beginning in step S10, the processing system sets an initial value of $e^{(0)} \epsilon S$, sets the parameter k=0, $Q_{min}>0$ and $e_{min}=e^{(0)}$. In step S12, the processing system calculates $Q(e^{(k)})$, wherein k is an iteration number, and $e \epsilon [\theta_{li}, \theta_{ui}] \times [\phi_{li}, \phi_{ui}]$. The parenthesis about k signifies that k is merely a superscript and does not raise e to the kth power. The process for calculating $Q(e^{(k)})$ will be described in detail below after describing of the remaining steps of the method.

In step S14, the processing system determines if $Q(e^{(k)})$ is less than $Q_{min}$, representing a proposed minimum system-wide average interference. If $Q(e^{(k)})$, representing an average system-wide interference, is less than $Q_{min}$, the method continues with step S16. If not, the method continues with step S18. In step S16, the processing system sets $Q_{min}=Q(e^{(k)})$ and $e_{min}=e^{(k)}$. The resultant radiation directions of all antennas are preferably associated with the best carrier-to-interference ratio (or at least the highest reasonably expected) at an entire group of measurement locations or selected measurement locations. For example, if the wireless network includes ten antennas and each antenna has five possible antenna radiation directions, the resultant radiation directions for the wireless network has 100,000 possible solutions.

Although in the illustrative example presented herein, we assumed that $e_{min}$ and $e^{(k)}$ refer to each antenna pattern having a fixed shape, a radiation pattern with a variable shape may be an additional parameter for the optimization procedure of the invention. The same data structure disclosed herein is generally applicable to simultaneously enhancing radio frequency coverage for radiation patterns having variable shapes and variable directions, albeit with greater degree of complexity.

In step S18, the processing system determines if k equals N. K represents a counter that counts different antenna radiation directions within the possible antenna radiation directions. If k equals N, then the processing system has already processed the measured samples or location measurement matrices for all measurement locations x. If k is less than N, the method continues in step S20. In step S20, the processing system sets k=k+1 to increment the iteration number represented by the variable k. From step S20, the method returns to step S12. After completing all necessary iterations dictated by the value of N, the intensive procedure is finished. Accordingly, upon completion of the intensive procedure, $e_{min}$ is stored in a memory or register of the processing system and represents the solution as a constellation of the resultant antenna radiation directions. The solution provides the selected setting of the antenna direction or orientation parameters for each antenna in the wireless network.

Now that the intensive comparison procedure of FIG. 7 generally has been described, the mathematical procedure for calculating $Q(e)$ and e for step S12 and step S16, respectively, are described in the following paragraphs.

The power of the received signal at any location in the network is the sum of the individual signal powers from all base stations that transmit on the same frequency or within a common frequency range. For the sake of simplicity, assume that all n base stations transmit in the same frequency band, although the method of the invention may be applied to more complicated scenarios. Further, assume that all n base stations operate within the same frequency range as is typical in a CDMA network. The foregoing assumption does not restrict the applicability of the proposed approach to other wireless networks with different frequency configurations. In accordance with the above assumptions, the carrier-to-interference ratio measured at a measurement location x with regard to base station i is modeled as the following equation:

$$\frac{S_i(x, e^i)}{\sum_{j=1}^{n} S_j(x, e^j) + N(x, e^1, e^2, \ldots, e^n)} \quad (7)$$

where $N(x, e^1, e^2, \ldots, e^n)$ refers to the background noise at x. The dependence of background noise on the directions $e^1, e^2, \ldots, e^n$ is caused by the interference from other channels using the same frequency band, the same channel within a frequency band, or the same carrier within a frequency band. For an unloaded system, background noise does not appreciably depend upon the radiation direction of all of the base station antennas and the background noise may be simplified as N(x) for an unloaded system, after ignoring any directional components related to the base station antennas.

Let $C_i$ denote the coverage area of base station i, then, the carrier-to-interference ratio given above is only defined for $x \in C_i$. Because the foregoing equation holds for $i=1, 2, \ldots, n$, it is necessary to assume the following relationship:

$$C_i \cap C_j = \theta \text{ for } i \sim j \quad (8)$$

The foregoing relationship ensures that the definition of the carrier-to-inference ratio is unique. The foregoing relationship does not apply to hand-off related optimization activities. Assuming a fixed transmit power of each base station, the value of the carrier-to-interference ratio is the primary consideration for achieving suitable resultant antenna directions. Considering that each antenna is oriented in a corresponding radiation direction and a test drive can include different measurement locations, the calculation of the carrier-to-interference ratio in accordance with the aforementioned equation is very computing intensive. Accordingly, instead of solving the above equation for a maximum carrier-to-noise ratio at measurement locations, the following equation may be solved for minimum interference at the measurement locations:

$$Q_i(x, e) := N(x, e) + \sum_{j=1; j \neq i}^{n} S_j(x, e^j) \text{ for } x \in C_i, \quad (9)$$

which involves only addition and, as such, may speed up the function evaluation in the optimization procedure, where $e=(e^1, e^2, \ldots, e^n)$ is a vector of 2n dimensions and is expressed as follows:

$$e \in x_{i=1}^{n}[\theta_{Li}, \theta_{Ui}] \times [\phi_{Li}, \phi_{Ui}] \quad (10)$$

Since each measurement location x uniquely belongs to a set $C_i$, the quality of the network can be measured by Q(x,e) of all measurement locations. In an attempt to maximize the carrier-to-interference ratio for every measurement location x, obvious conflicts arise between measurement locations. Accordingly, the maximum carrier-to-interference ratio (or approximation thereof) for a measurement location within one cell may be achieved at the expense of the carrier-to-interference ratio for another measurement location in other cell.

Because determining e is the object of the adjustment method, an average over the variable x (i.e. measurement location) to allow for differences between the coverage achieved at various measurement locations and their corresponding cells. For this purpose, we introduce a measure $\mu \in [0,1]$ on $C = \cup^n_{i=1} C_i$ and define a scalar quantity in accordance with the following equation:

$$Q(e) = \int_C Q(x, e) \mu\{dx\}, \quad (11)$$

where $\mu$ does not need be continuous. For the discrete case and in accordance with a practical example based on the foregoing equation, the above integral may be expressed as a weighted sum in which each location measurement has a corresponding weight factor. The weighted sum equation is expressed as follows:

$$Q(e) = \sum_{j=1}^{m} Q((x_j, e) w_j \quad (12)$$

where $x_j$ refers to the discrete location and $$\sum_{j=1}^{m} w_j = 1. \quad (13)$$

Application of measure $\mu$ can avoid overvaluing some cells at the sacrifice of other cells. For example, if a test drive route in a cell $C_i$ is very short, the carrier-to-interference ratio in this cell may be suppressed disadvantageously in comparison to other cells, or even the average carrier-to-interference ratio. Therefore, to avoid this bias due to unequal size of $C_i$, it is reasonable to chose $\mu$ so that:

$$\mu\{dx\} = \frac{dx}{|C_i| \cdot n} \text{ for } x \in C_i \quad (14)$$

where the absolute value of $C_i$ refers to the length of the path of the test drive in cell i and $i=1, 2, 3 \ldots, n$. Correspondingly, the weights of the discrete case are as follows:

$$w_i = \mu\{d(x_i, x_{i-1})\} \quad (15)$$

where $d(x_i, x_{i-1})$ refers to the real distance a mobile travels from location $x_{i-1}$ to $x_i$ and $x_o$ is the start point.

For example, with n possible base station identifiers, if each antenna has q possible directions and if all interference values are considered for an exact solution, the calculation pursuant to the intensive comparison procedure of FIG. 7 will require $N=q^n$ function evaluations for each measurement location which makes a total of $m \times q^n$ before the minimum interference value is reached and the corresponding $e_{min}$ is determined. Thus, if N is too large for the processing capability of the processing system, the alternate simulated annealing approach described in conjunction with FIG. 8 may be used instead of the intensive comparison procedure of FIG. 7. Whether or not N is too large is determined according to objective compliance with standard business practices and technological conventions with reference to the processing capacity and requisite processing time of a single or multiple processor computer used to practice the method.

Figure 8:
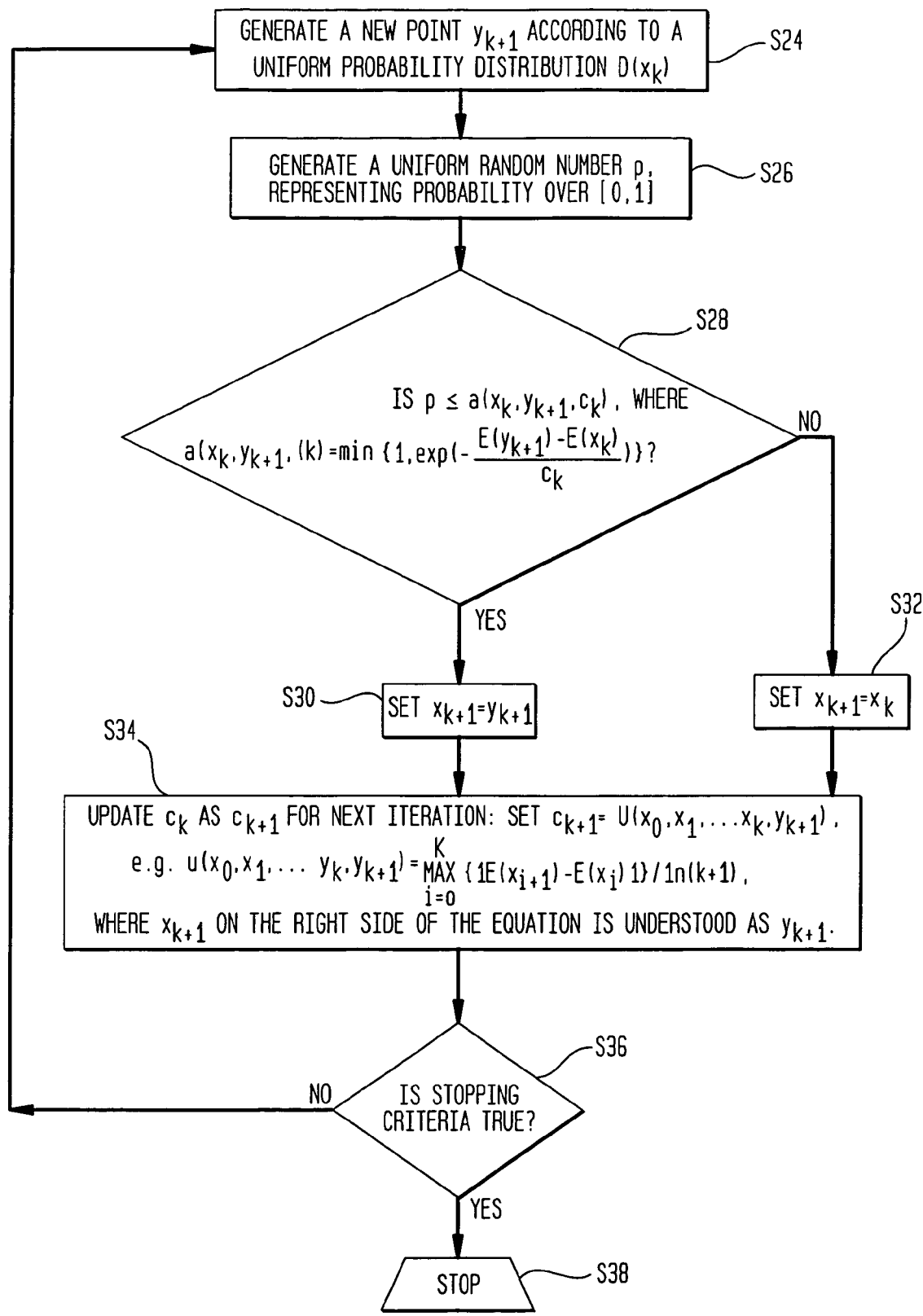
FIG. 8 is a flow chart showing a simulated annealing procedure for determining resultant antenna radiation directions to minimize average interference in the wireless network in accordance with the invention.

FIG. 8 shows a simulated-annealing procedure for accomplishing step S106 of FIG. 2. FIG. 8 is an alternative procedure of FIG. 7. The simulated-annealing approach is shown in the flow chart of FIG. 8. The simulated-annealing approach statistically samples location measurement matrixes to reduce processing capacity, processing time, or both in comparison to the intensive comparison approach of FIG. 7.

In accordance with the simulated annealing procedure, the lowest average system-wide interference and the corresponding antenna radiation directions for each antenna site, may be estimated to reduce the processing capacity, processing time, or both. The simulated-annealing procedure involves generating a random number to select a proposal for the average lowest system-wide interference (or approximation thereof) over all measurement locations or selected measurement locations. The probability is evaluated to determine whether or not the selected candidate is accepted as the next estimate of an average lowest system-wide interference.

The following mathematical expressions are pertinent to further understanding the simulated annealing procedure. The simulated-annealing approach defines the configuration attributes, rearrangement attributes, objective functions, and an annealing schedule. The configuration attributes include base stations that are numbered i=1, 2, . . . , n. The rearrangement attributes preferably include two random numbers that are used to generate a new pair of random numbers represented as (θ, φ). The objection function is defined as E:=Q(e) and is directed at a minimization problem. The annealing schedule defines states representing various pseudo-energy levels. A state corresponding to a new pseudo-energy level is taken to replace the old with the probability expressed by the following equation:

$$p = \exp[-(E_n - E_o)/c_k] \quad (16)$$

where $c_k$ is an iteration or control parameter to be determined, $E_n$ is a current pseudo-energy state and $E_o$ is an original or previous pseudo-energy state. The variable $c_k$ may have a value initially based on the particular configuration of the wireless system subjected to the adjustment method of the invention. In case $E_n < E_o$, probability p=1 is assigned. The annealing schedule usually takes downhill steps in energy level state, while sometimes taking an uphill step that may counteract a previous downhill step in an energy level state.

The function a $(x_k, y_{k+1}, c_k)$ is modeled after the annealing schedule of p=exp $[-(E_n - E_o)/c_k]$. The foregoing uphill step is executed to avoid the erroneous selection of a local minimum as the absolute estimated minimum for the function a$(x_k, y_{k+1}, c_k)$. The function a$(x_k, y_{k+1}, c_k)$ contributes toward finding a constellation of resultant antenna radiation directions by expediting the comparison of the system-wide interference associated with different candidate constellations of antenna radiation directions.

The function a$(x_k, y_{k+1}, c_k)$ provides a probability value between 0 and 1, inclusive, for replacing a previous constellation of radiation direction states for a current constellation of radiation direction states of the antenna systems 20 to eventually attain an optimal constellation of radiation direction states after iterative executions. The selected constellation of radiation direction states corresponds to the lowest system-wide carrier-to-interference or the lowest reasonably acceptable system-wide carrier to interference for an objective wireless service provider.

The actual process of calculating an estimated lowest system-wide interference level is an iteration with convergence in probability. The important part is to define a deterministic or an adaptive schedule for $c_k$, where k refers to the iteration step and may be represented as a counter. Let $x_k$ denote the current point at iteration k, with the corresponding energy $E_n = E(x_k)$, wherein $x_k = e^{(k)}$ such that $x_k$ represents a randomly selected constellation of radiation direction states that corresponds to a candidate constellation of antenna direction states, expressed as $e^{(k)}$.

Referring to FIG. 8, starting in step S24, a new point $y_{k+1}$ is generated according to a probability distribution $D(x_k)$, which is preferably a uniform distribution. Next, in step S26 a uniform random number p is generated over [0,1]. Using the random number p from step S26, in step S28, a processor executes the following expression to determine whether or not $x_{k+1}$ is updated:

Is $p \leq a(x_k, y_{k+1}, c_k)$, where $a(x_k, y_{k+1}, c_k) = \min\{1, \exp[-(E(y_{k+1}) - E(x_k))/c_k]\}$?

In the foregoing equation, $y_{k+1}$ represents a new proposed value of a constellation of antenna radiation directions, whereas $x_k$ represents a previous value of a constellation of antenna radiation directions. If the result of step S28 is true, in step S30 $x_{k+1}$ is set equal to $y_{k+1}$. The above equation is consistent with the principle that if the new system-wide interference (Q) is less than the previous system-wide interference (Q) for a group of measurement locations x, the new system-wide interference is accepted. Accordingly, system-wide interference (Q) is usually, but not always, decreased by acceptance of $y_{k+1}$ as a new value.

If the result of the execution in step S28 is false, then step S32 sets $x_{k+1} = x_k$. Accordingly, the above equation is consistent with the principle that if Q would be increased by acceptance of $y_{k+1}$ and if the probability does not indicate acceptance of $y_{k+1}$, the previous value of $x_k$ is preserved. The probability may indicate acceptance of $y_{k+1}$ when the execution of step S28 is false to prevent Q from being locked into a local minimum of system-wide interference, rather than attaining a global minimum of system-wide interference. In step S34 following step S30 or step S32, $c_{k+1}$ is set equal to $u(x_0, x_1, \ldots, x_k, y_{k+1})$, where $u(x_0, x_1, \ldots, x_k, y_{k+1})$ may be expressed as the following equation for illustrative purposes:

$$u(x_0, x_1, \ldots, x_k, y_{k+1}) = \max_{i=0}^{k}\{|E(x_{i+1}) - E(x_i)|\}/\ln(k+1) \quad (17)$$

In the above equation $x_{k+1}$ on the right side of the equation is understood as $y_{k+1}$. In step S36, the processor decides whether or not the stopping criteria is fulfilled. For example, the stopping criteria could determine if system-wide interference (Q) is at an acceptable level based on empirical evidence from at least one previous execution of the antenna adjustment procedure of the present invention with other wireless networks. Once the system-wide interference achieves an acceptable level, the antenna adjustment procedure may be stopped even though the absolute estimated minimum of the system-wide interference may not have been attained. Accordingly, the burden on the processing system may be reduced and the antenna adjustment procedure may be expedited by stopping at a practical solution which meets engineering objectives in accordance with the simulated annealing approach. The above concepts may be applied equally to the maximization of system-wide carrier-to-interference as well as the minimization of system-wide interference. If the stopping criteria is fulfilled, the procedure ends in step S38. If the stopping criteria is not fulfilled, the procedure continues starting again in step S24.

In sum, the simulated-annealing approach represents a compromise between attaining the absolute system-wide interference, or absolute maximum carrier-to interference ratio, and data processing efficiency. The actual result corresponding to a system-wide interference may be assigned a probability that the actual result produces the lowest system-wide interference. For example, the actual result of the simulated-annealing approach may be supplemented by an estimated confidence probability, within a range from 70 percent to 90 percent confidence, that the actual result reflects the absolute minimum system-wide interference. The simulated-annealing approach is most applicable where $c_k$ is reciprocally proportional to the natural logarithm of k+1 to attain convergence of the solution.

In accordance with the invention, the method produces readily repeatable measurement results by incorporating sound principles basic to the scientific method and organizing prodigious amounts of data in multi-dimensional matrices. Advantageously, the multi-dimensional matrices contribute to the modular nature of the software instructions for implementing the intensive approach of FIG. 7, the simulated-annealing approach of FIG. 8, or modifications of either approach, to solve for minimal average interference and corresponding antenna directions. Further, the orderly organization of the data structure is well-suited for processing by mathematical approaches other than the intensive approach or the simulated-annealing approach. The data structure, such as the location measurement matrix, is readily applicable to a prodigious assortment of different mathematical algorithms which fall within the scope of the invention.

Figure 9:
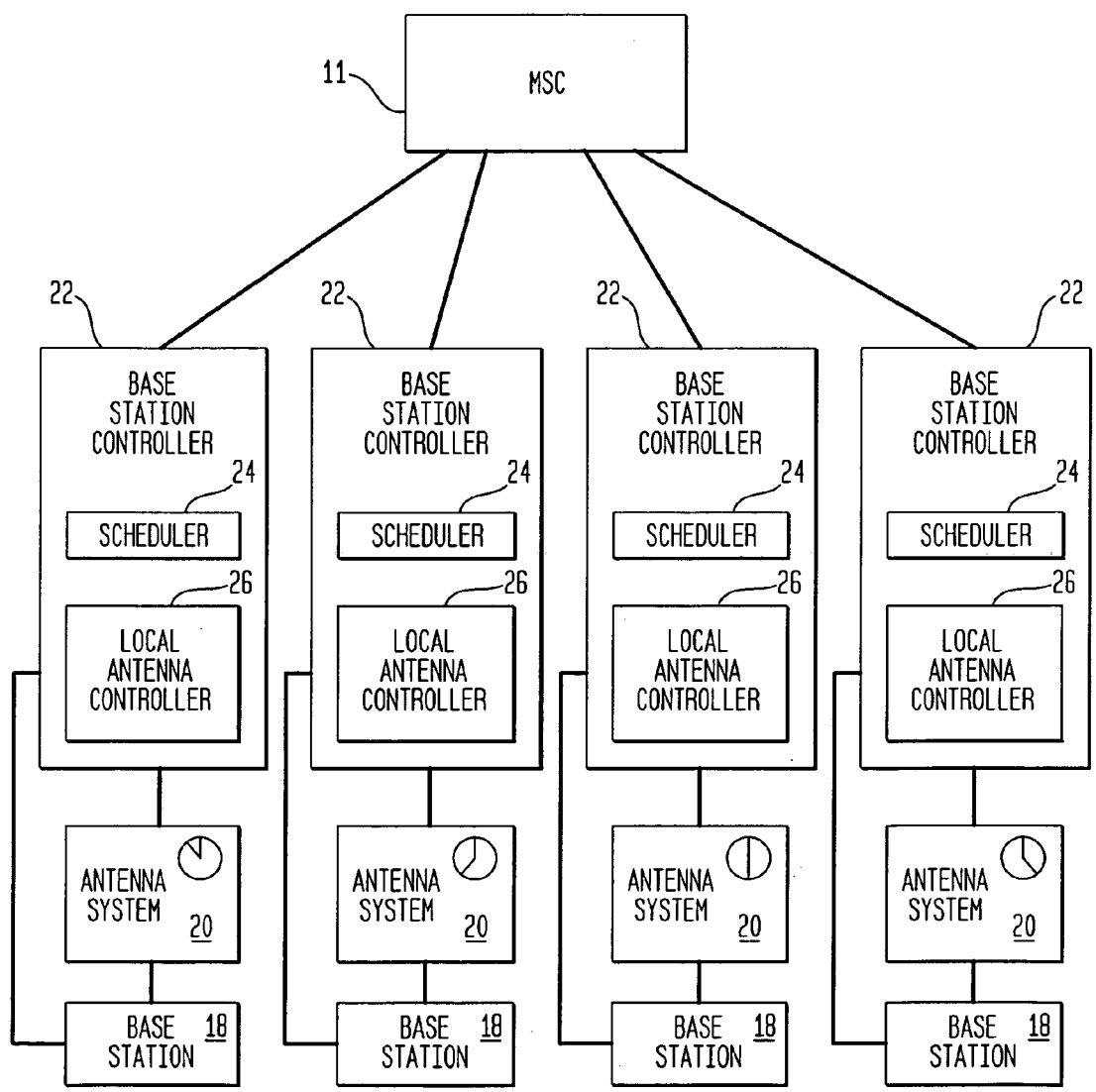
FIG. 9 is a block diagram of a second embodiment of a wireless network in accordance with the invention.

FIG. 9 shows an alternate wireless network configuration with respect to FIG. 1. Like reference numbers in FIG. 1 and FIG. 9 indicate like elements. The wireless network of FIG. 9 is the same as the wireless network of FIG. 1 except for the mobile switching center 11 and the base station controllers 22. In particular, the mobile switching center 11 of FIG. 9 may comprise any suitable mobile switching center without a scheduler 12 and a central antenna controller 14. Instead, each base station controller 22 includes a local scheduler 24 and a local antenna controller 26. Accordingly, FIG. 9 advantageously allows most programming changes to be carried out at the base station 18 or the base station controller 22, as opposed the mobile switching center 11. One of ordinary skill in the art will appreciate that the software associated with the base station 18 and the base station controller 22 is often easier to modify and less elaborate than the software of the mobile switching center 11.

The local antenna controller 26 and local scheduler 24 control each corresponding antenna system 20 separately, but coordinate with one another by communicating through the mobile switching center 11. However, the communications between the local scheduler 24 and the mobile switching center 11 may be limited to activating the local scheduler 24 and turning off the local scheduler 24 to reduce signaling traffic between the mobile switching center 11 and the base station controllers 22.

The communications between the location scheduler 24 and the mobile switching center 11 do not need to be accomplished in real-time so long as each local antenna controller 26 is synchronized with the other local antenna controllers 26 for generating radiation pattern direction changes at defined times offset from one another. In a preferred embodiment, each local antenna controller 26 is synchronized by a local global positioning system (GPS) clock at each base station. In an alternate embodiment, a network clock (e.g., rubidium-based, high-stability oscillator) located at a base station controller 16 or the mobile switching center 10 provides a network clock for synchronization of the local antenna controllers 26.

Each local antenna controller 26 cooperates with other local antenna controllers 26 based upon a schedule for coordinating the radiation direction change of each antenna to suitably judge overall wireless system performance. The local antenna controllers 26 cooperate to perform the same functions and results as the central antenna controller 14. Similarly, the local schedulers 24 of FIG. 9 cooperate to perform the same functions and results as the central scheduler 12 of FIG. 1.

The watch-face symbols on each antenna system 11 represent different unique time slots for electromagnetic transmission from corresponding antenna systems 20 and base stations 18 during a measurement procedure. Each base station 18 and corresponding antenna system 20 is preferably assigned at one time slot per scanning period 82 at a measurement location. Each time slot corresponds to one measurement cycle of an antenna system 20. The time slots are offset from each other and synchronized as symbolically illustrated by the watch-face symbols. Accordingly, each time slot is preferably sufficient to permit changing each radiation direction state of a corresponding antenna system 20 within the first limit and the second limit, as previously defined. Each designated base station 18 and antenna system 20 in the wireless system preferably transmits for its time slot, while all other base stations 18 and corresponding antenna systems 20 remain idle awaiting their turn as manifested by unique time slots in a time-division multiplex manner.

The configuration of FIG. 9 is well-suited for testing the carrier-to-interference ratio associated with the potentially resultant antenna radiation directions. The base stations 18 generate identifier codes for transmission via the antenna systems 20 such that each base station 18 and its associated antenna system 20 may be identified by the test receiver 21 during measurements at measurement locations. The test receiver 21 informs the mobile switching center 11 via a base station 18 once all measurements are complete to stop the measurement procedure and resume normal operations, or another operational mode.

This specification describes various embodiments of the system and method of the present invention. The scope of the claims is intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and scope of the invention disclosed herein.

The following is claimed:

1. A method for adjusting antenna radiation for a wireless network or segment thereof, the method comprising the steps of:

varying antenna radiation directions of a plurality of antennas throughout ranges of antenna radiation directions;

measuring signal parameters for the varied antenna radiation directions for a plurality of measurement locations; and determining a resultant antenna radiation direction within the ranges for each of the antennas in the wireless network or segment thereof in which to transmit to a plurality of subscribers based on the measured signal parameters to achieve desired performance criteria, by determining a system-wide minimal or maximum average of an interference signal strength over a group of the measurement locations and identifying a constellation of resultant antenna radiation directions associated with the system-wide minimal or maximum average for the group.

2. The method according to claim 1 wherein the resultant antenna radiation direction is defined as a two dimensional vector representing angle of azimuth from a corresponding antenna and a down-tilt angle from the corresponding antenna.

3. The method according to claim 1 wherein a candidate antenna radiation direction, for the resultant antenna radiation direction, is defined as including a central vector representing a peak gain of a main lobe of radiation, a first limit vector representing a first limit of radiation direction states, and a second limit vector representing a second limit of radiation direction states.

4. The method according to claim 1 wherein the measuring step comprises measuring signal strengths as the signal parameters at the measurement locations.

5. The method according to claim 1 wherein the determining step comprises determining a system-wide minimal average of an interference signal strength over a group of the measurement locations and identifying a constellation of resultant antenna radiation directions associated with the system-wide minimal average for the group.

6. The method according to claim 1 wherein the determining step comprises determining a system-wide minimal average of an interference signal strength plus background noise over a group of the measurement locations and identifying a constellation of the resultant antenna radiation directions associated with the system-wide minimal average for the group.

7. The method according to claim 1 wherein the determining step comprises determining a system-wide maximum signal-to-noise ratio average over a group of the measurement locations and identifying a constellation of resultant antenna radiation directions associated with the system-wide maximum for the group.

8. The method according to claim 1, wherein the determining step is based on a collection of the measured signal parameters.

9. A method for adjusting antenna radiation for a wireless network or segment thereof, the method comprising the steps of:

varying antenna radiation directions of a plurality of antennas throughout ranges of antenna radiation directions;

measuring signal parameters for the varied antenna radiation directions for a plurality of measurement locations;

organizing the measured signal parameters into a location measurement data structure corresponding to each measurement location;

deriving averages of interference from the measured signal parameters and associating each average of interference with candidates for a resultant antenna radiation directions; and determining the resultant antenna radiation direction within the ranges for each of the antennas in the wireless network or segment thereof in which to transmit to a plurality of subscribers based upon data in the location measurement data structure are derived averages of the interference, such that a measurement characteristic of transmission from the antenna meets a desired performance criteria.

10. The method according to claim 9 wherein the determining step further comprises comparing successive averages of interference measurements associated with corresponding candidates for the resultant antenna radiation directions to identify the candidates associated with a lower of a presently determined average of interference measurements and a previously determined lowest average of interference measurement.

11. The method according to claim 9 further comprising the step of:

selecting the resultant antenna directions as candidates corresponding to the lower of the presently determined average of interference and the previously determined lowest average of the interference measurement.

12. The method according to claim 9 wherein the deriving step further comprises assigning each of the measurement locations a corresponding weight factor for calculating a weighted average to replace and supercede the average of interference, a total of the measurement locations having an aggregate weight factor approximately or exactly equal to one.

13. The method according to claim 9 wherein the determining step further comprises the steps of:

generating a random number to choose candidates for the resultant radiation pattern directions associated with an average lowest system-wide interference over the measurement locations;

evaluating a probability that the chosen candidates actually provides the average lowest system-wide interference;

estimating the chosen candidates as the resultant radiation pattern directions providing the average lowest system wide interference if the evaluated probability meets a requisite confidence criteria.

14. The method according to claim 9 wherein the determining step applies the following equation in accordance with an intensive procedure for determining a constellation of the resultant antenna radiation directions associated with a lowest average system-wide interference over the measurement locations:

$$Q(e^{(k)}) < Q_{min},$$

wherein k is an iteration number, and $e \in [\theta Li, \theta Ui] \times [\phi Li, \phi Ui]$, $Q_{min}$ represents the lowest average system wide interference, $Q(e^{(k)})$ represents a proposed minimum average system-wide interference corresponding to a candidate constellation of antenna radiation directions expressed as $e^{(k)}$.

15. The method according to claim 9 wherein the determining step applies the following equations in accordance with an simulated-annealing procedure for determining a constellation of resultant antenna radiation directions associated with a lowest average system-wide interference over the measurement locations:

$$x_{k+1} = \begin{cases} y_{k+1} & p \leq a(x_k, y_{k+1}, c_k) \\ x_k & \text{otherwise} \end{cases}$$

$$a(x_k, y_{k+1}, c_k) = \min\left\{1, \exp\left(-\frac{E(y_{k+1}) - E(x_k)}{c_k}\right)\right\}$$

wherein $a(x_k, y_{k+1}, c_k)$ is a function providing a probability value between 0 and 1 for deciding whether or not to set $x_{k+1} = y_{k+1}$ or $x_{k+1} = x_k$, wherein $E(y_{k+1})$ represents a current pseudo-energy state, $E(x_k)$ represents a previous pseudo-energy state, $x_k$ represents a previous value of a candidate constellation of antenna directions, $y_{k+1}$ represents a new proposed value of a candidate constellation of antenna directions, $c_k$ is an iteration control parameter, and k represents an iteration step, and $x_k = e^{(k)}$ where $e^{(k)}$ represents a candidate constellation of antenna radiation direction states corresponding to an iteration step k.

16. The method according to claim 15 further comprising the step of updating $c_k$ as $c_{k+1}$ for a next iteration in accordance with the following equation:

$$u(x_0, x_1, \ldots, x_k, y_{k+1}) = \max_{i=0}^{k}\{|E(x_{i+1}) - E(x_i)|\} / \ln(k+1)$$

wherein $x_{k+1}$ on a right side of the equation is understood as $y_{k+1}$.

17. The method according to claim 9 wherein the organizing step includes the location data structure comprising a matrix conforming to the following mathematical expression:

$$\begin{pmatrix} S_1(x, e_1^1) & S_1(x, e_2^1) & \ldots & \ldots & S_1(x, e_q^1) \\ S_2(x, e_1^2) & S_2(x, e_2^2) & \ldots & \ldots & S_2(x, e_q^2) \\ \vdots & \vdots & \vdots & \vdots & \vdots \\ S_n(x, e_1^n) & S_n(x, e_2^n) & \ldots & \ldots & S_n(x, e_q^n) \end{pmatrix}$$

wherein S represents measured signal strength in power, a subscript of S represents a base station identifier up to an nth base station identifier, x represents a measurement location, e represents an antenna radiation direction among q possible antenna radiation directions as a subscript of e, and n possible antenna identifiers as a superscript of e.

18. The method according to claim 9 wherein the determining step includes the background noise conforming to the following mathematical expression:

$$\begin{pmatrix} N_1(x, e_1^1) & N_1(x, e_2^1) & \ldots & \ldots & N(x, e_q^1) \\ N_2(x, e_1^2) & N_2(x, e_2^2) & \ldots & \ldots & N_2(x, e_q^2) \\ \vdots & \vdots & \vdots & \vdots & \vdots \\ N_n(x, e_1^n) & N_n(x, e_2^n) & \ldots & \ldots & N_n(x, e_q^n) \end{pmatrix}$$

wherein N represents measured noise power, a subscript of N represents a base station identifier up to an nth base station, x represents a measurement location, e represents an antenna radiation direction among q possible antenna radiation directions, as a subscript of e and n possible antennas, as a superscript of e.

19. The method according to claim 9 wherein the varying step changes the antenna radiation directions throughout the ranges of radiation states in a manner commensurate with a stationary or mobile duration of a test receiver being coincident with each of the measurement locations.

20. The method according to claim 9 wherein the varying step establishes the schedule as a first list for organizing the antennas within the wireless network into an antenna measuring order and a second list for organizing a radiation direction measuring order for each antenna.

21. A system for adjusting antenna radiation in a wireless network, the system comprising:
a plurality of base stations associated with corresponding antenna systems;
a plurality of local antenna controllers for controlling antenna radiation directions of the antenna systems such that the antenna radiation directions associated with each antenna system are cycled throughout a range of antenna radiation directions;
a plurality of local schedulers for communicating with corresponding ones of the local antenna controllers, the local scheduler coordinating the antenna radiation patterns of different ones of the antenna systems in a time-division multiplex manner such that only one antenna radiation pattern from one antenna system and its associated base station is generated at any time during a measurement procedure.

22. The system according to claim 21 further comprising:
a test receiver for measuring signal strengths from the corresponding antenna systems at selected measurement locations.

23. The system according to claim 21 further comprising:
a data processing system for organizing the measured signal strengths into a location measurement matrix corresponding to each selected measurement location, the data processing system determining a resultant antenna radiation direction within the range for each of the antennas in the wireless network or segment thereof based upon the location measurement matrices.

24. The system according to claim 23 wherein the resultant antenna radiation direction is defined as a two dimensional vector representing angle of azimuth from a corresponding antenna system and down-tilt angle from the corresponding antenna system.

25. The system according to claim 23 wherein a candidate for a resultant antenna radiation direction is defined as including a central vector representing a peak gain of a main lobe of radiation, a first limit vector representing a first limit of radiation direction states and a second limit vector representing a second limit of radiation direction states.

26. The system according to claim 21 wherein the local schedulers coordinate the antenna radiation patterns of different ones of the antenna systems such that each antenna system and its associated base station has an assigned time slot, for transmitting at least one radiation pattern direction state, per scanning period associated with each measurement location.

27. The system according to claim 21 wherein each of the base stations is adapted to transmit a unique base station identifier code for identification of actively radiating ones of the antenna systems and their associated radiation directions.

28. A system for adjusting antenna radiation in a wireless network, the system comprising:
a plurality of base stations associated with corresponding antenna systems;
a central antenna controller for controlling antenna radiation directions of the antenna systems such that the antenna radiation directions associated with each antenna system are cycled throughout a range of antenna radiation directions;
a central scheduler for communicating with the central antenna controller, the central scheduler coordinating the antenna radiation patterns of different ones of the antenna systems in a time-division multiplex manner such that only one antenna radiation pattern from one antenna system and its associated base station is generated at any time during a measurement procedure.

29. The system according to claim 28 further comprising:
a test receiver for measuring signal strengths from the corresponding antenna systems at selected measurement locations throughout the range.

30. The system according to claim 28 further comprising:
a data processing system for organizing the measured signal strengths into a location measurement matrix corresponding to each selected measurement location, the data processing system determining a resultant antenna radiation direction within the range for each of the antennas in the wireless network or segment thereof based upon the location measurement matrices.

31. The system according to claim 30 wherein the resultant antenna radiation direction is defined as a two dimensional vector representing angle of azimuth from a corresponding antenna system and down-tilt angle from the corresponding antenna system.

32. The system according to claim 30 wherein a candidate for the resultant antenna radiation direction is defined as including a central vector representing a peak gain of a main lobe of radiation, a first limit vector representing a first limit of radiation direction states and a second limit vector representing a second limit of radiation direction states.

33. The system according to claim 28 wherein the central scheduler coordinates the antenna radiation patterns of different ones of the antenna systems such that each antenna system and its associated base station has an assigned time slot, for transmitting at least one radiation pattern direction state, per scanning period associated with each measurement location of the test receiver.

34. The system according to claim 28 wherein each of the base stations is adapted to transmit a unique base station identifier code for identification of actively radiating ones of the antenna systems and their associated radiation directions.

35. A method for adjusting antenna radiation for a wireless network or segment thereof, the method comprising the steps of:
varying antenna radiation directions of a plurality of antennas throughout ranges of antenna radiation directions;
measuring signal parameters for the varied antenna radiation directions for a plurality of measurement locations;
determining a resultant antenna radiation direction within the ranges for each of the antennas in the wireless network or segment thereof in which to transmit based on a collection of the measured signal parameters to achieve desired performance criteria.

36. The method of claim 35, wherein the varying step sets the antenna radiation directions to a first of a plurality of range states, each of the plurality of range states being particular antenna radiation directions for each of the plurality of antennas.

37. The method of claim 36, wherein the measuring step measures signal parameters for the first range state at the plurality of measurement locations.

38. The method of claim 37, further comprising:
repeating the varying and measurement steps for each of the remaining plurality of range states to form the collection of the measured signal parameters.

39. The method of claim 35, wherein the measured signal parameters include information related to the plurality of measurement locations for each of a plurality of range states, each of the plurality of range states being particular antenna radiation directions for each of the plurality of antennas.

40. The method of claim 39, wherein the information is related to interference at the plurality of measurement locations.

41. The method of claim 40, wherein the desired performance criteria is achieved by selecting the range state with a lowest average interference throughout the plurality of measurement locations as the resultant antenna radiation direction.

* * * * *